United States Patent [19]

Rice, Jr.

[11] 4,211,158
[45] Jul. 8, 1980

[54] HOLDING DEVICE

[76] Inventor: DeLong Rice, Jr., 2140 Victoria Ave., Memphis, Tenn. 38116

[21] Appl. No.: 59,973

[22] Filed: Jul. 23, 1979

[51] Int. Cl.³ ............................................. A47J 37/12
[52] U.S. Cl. ..................................... 99/403; 24/81 R;
24/255 R; 99/419; 99/448; 99/449; 211/89;
248/37.6; 248/113; 294/87 SH; 426/421
[58] Field of Search ................. 99/403, 410, 417, 416,
99/419, 421 V, 413, 448, 449, 411; 24/73 R, 255
R, 81 R; 118/502, 503; 426/91, 134, 421;
294/87 R, 87 SH; 211/89; 248/37.6, 113

[56] References Cited

U.S. PATENT DOCUMENTS

| 1,706,491 | 3/1929 | Jenkins | 99/411 X |
| 1,809,190 | 6/1931 | Brimer | 118/503 |
| 1,826,240 | 10/1931 | Chisholm | 118/503 |
| 2,165,789 | 7/1939 | Elwell | 294/87 SH |
| 2,460,136 | 1/1949 | Leonard | 248/113 X |
| 2,570,374 | 10/1951 | Pompa | 99/416 |
| 3,305,100 | 2/1967 | Barbee | 248/37.6 X |
| 3,316,010 | 4/1967 | Lowrance | 99/419 X |
| 3,563,160 | 2/1971 | Otsuka | 99/421 V |
| 3,757,673 | 9/1973 | Wallace | 99/448 |
| 3,858,496 | 1/1975 | Downers | 99/448 |

Primary Examiner—Billy J. Wilhite

[57] ABSTRACT

A device for holding food articles that are impaled on sticks. The device includes a body member having first and second transverse grooves thereacross. The second transverse groove is positioned within the first transverse groove. A spring clip is positioned over the transverse grooves to selectively clamp one of the sticks between the body member and the spring clip. The first transverse groove is shaped to receive sticks having a substantially rectangular cross section. The second transverse groove is shaped to receive sticks having a substantially circular cross section.

7 Claims, 8 Drawing Figures

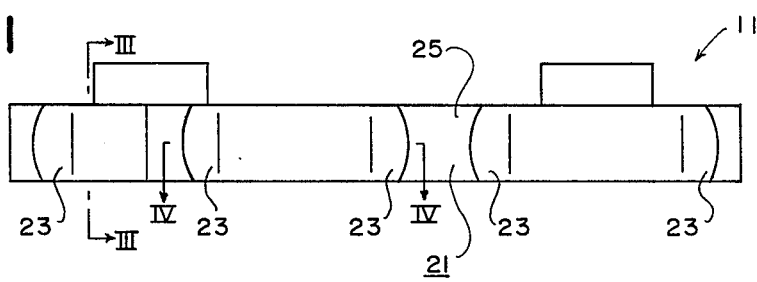
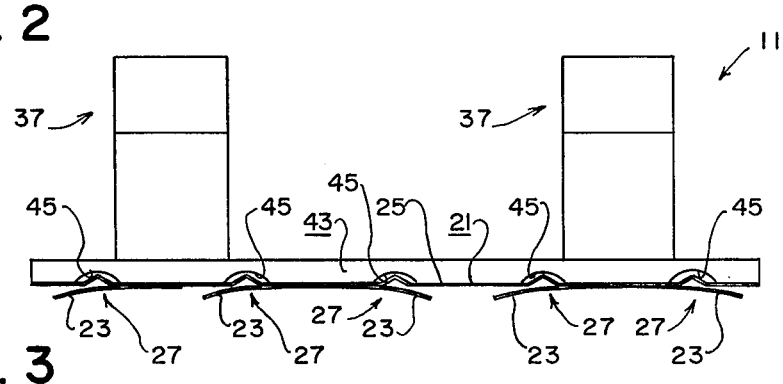
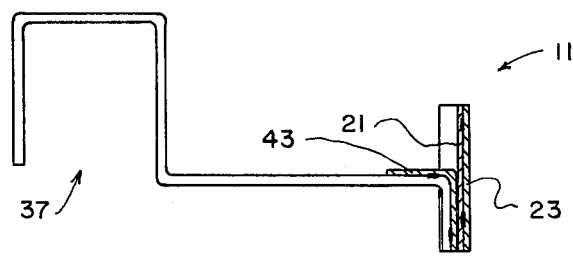
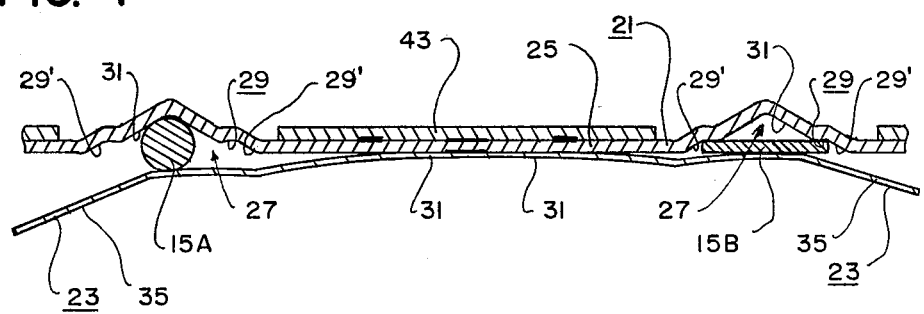

HOLDING DEVICE

BACKGROUND OF THE INVENTION

1. Field of the Invention

The present invention relates generally to devices for holding food articles and more specifically to devices for holding food articles that are impaled on sticks.

2. Description of the Prior Art

Lowrance, U.S. Pat. No. 3,316,010 and Downers, U.S. Pat. No. 3,858,496 disclose devices for holding food articles that are impaled on sticks. Brimer, U.S. Pat. No. 1,809,190; Chisholm, U.S. Pat. No. 1,826,240; Pompa, U.S. Pat. No. 2,570,374; and Wallace, U.S. Pat. No. 3,575,673 discloses various holding devices which may be of aid to persons wishing to make and/or use the present invention. None of the above patents disclose or suggest the present invention.

SUMMARY OF THE INVENTION

The holding device of the present invention is directed towards improving upon prior methods of and devices for holding food articles that are impaled on sticks while the food articles are processed. The concept of the present invention is to provide such a device which will hold sticks having substantially flat, rectangular cross sectional shapes or sticks having circular cross sectional shapes equally well.

The holding device of the present invention includes a body means having first and second transverse grooves extending thereacross for selectively receiving a stick onto which an article of food is impaled, the second transverse groove being located within the first transverse groove; and a spring clamp means having a first portion attached to the body means and having a second porttion extending across the first and second transverse grooves for clamping the stick to the body means to hold the article of food from the body means.

BRIEF DESCRIPTION OF THE DRAWINGS

FIG. 1 is a front elevational view of the holding device of the present invention.

FIG. 2 is a top plan view thereof.

FIG. 3 is a sectional view thereof as taken on line III—III of FIG. 1.

FIG. 4 is an enlarged sectional view of a portion thereof as taken on line IV—IV of FIG. 1 with a pair of sticks shown associated therewith.

DESCRIPTION OF THE PREFERRED EMBODIMENT

Figure 5:
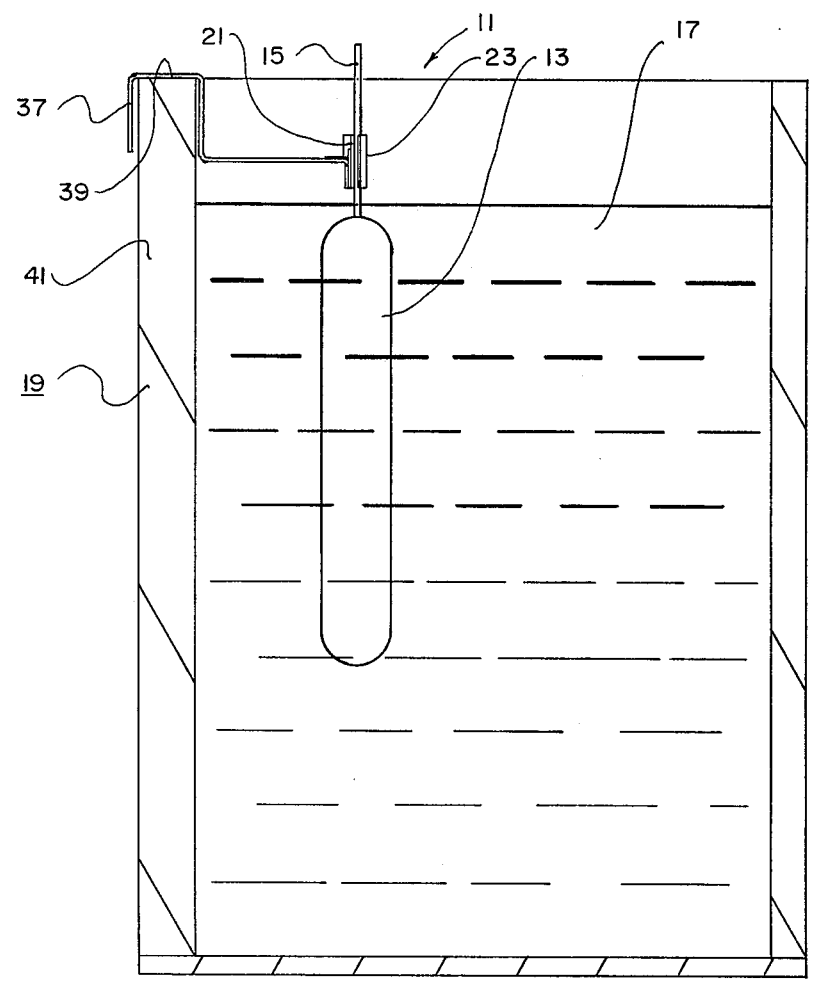
FIG. 5 is a side elevational view thereof with the holding device shown suspending an article of food in a cooking medium in a cooking device.

The holding device 11 of the present invention is for suspending articles 13 of food that have been impaled on elongated sticks 15 in a cooking medium such as heated oil in a cooking device 19 (see FIG. 5). The holding device 11 includes, in general, a body means 21 and one or more spring clip means 23.

The body means 21 preferably consists of a rigid, elongated member 25 having a plurality of transverse groove means 27 thereacross. Each groove means 27 includes a first transverse groove 29 and a second transverse groove 31 with each of the second transverse grooves 31 being positioned within one of the first transverse grooves 29 (see, in general, FIG. 4). Each of the first transverse grooves 29 consist substantially of a rectangular groove but having sidewalls 29' that slope outwardly (see FIG. 4). Each of the second transverse grooves 31 consists substantially of a vee groove positioned substantially centrally of a rectangular groove as clearly shown in FIG. 4. More clearly, each groove 27 may be viewed as having two small, spaced shallow vee-shaped grooves 29, 29' and a central larger, deep vee-shaped groove 31 positioned between the two shallow vee-shaped grooves 29, 29' as clearly shown in FIG. 4. Thus, each groove means 27 will have a peculiar shape as shown in FIG. 4. The shape of the second transverse groove 31 is especially adapted to receive sticks having a circular cross sectional shape as indicated by the stick 15A in FIG. 4. The first transverse groove 29 is especially adapted to receive sticks having a substantially flat, rectangular cross sectional shape as indicated by the stick 15B in FIG. 4.

Each spring clip means 23 has a first portion 35 for being attached to the rigid, elongated member 25 of the body means 21 and has a second portion 35 for extending across at least a portion of one of the transverse groove means 27 for selectively clamping one of the sticks 15 between the body means 21 and the spring clip means 23 (see, in general, FIG. 4). The second portion 35 of each spring clip means 23 preferably begins to angle inward toward the body means 21 substantially at the inside edge of the transverse groove means 27 and preferably begins to angle outward of the body means 21 substantially at the center of the second transverse groove 31 with which it is associated (see, in general, FIG. 4).

The holding device 11 preferably includes a bracket means attached to the body means 21 for removably attaching the body means 21 to the cooking device 19. The bracket means may include a pair of hook members 37 for placement over the upper edge 39 of a wall 41 of the cooking device 19 (see FIG. 5). A rigid, elongated reinforcing member 43 may extend along the length of the rigid, elongated member 25 of the body means 21 to strengthen the body means 21. The reinforcing member 43 may be substantially L-shaped in cross section, as clearly shown in FIG. 3 and may include cut out portion 45 at various locations therein for accomodating the transverse groove means 27 (see FIG. 2).

The holding device 11 may be constructed in any manner apparent to those skilled in the art. For example, the body means 21, hook members 37, and reinforcing member 43 may be constructed of a "T304" stainless steel with various components thereof spot-welded together as clearly indicated in the drawings and the spring clip means 23 may be constructed of a "T301" full hard stainless steel which has a spring-like characteristic and sufficient elastic limits and may be spot-welded to the rigid, elongated member 25 of the body means 21 as clearly indicated in the drawings. It should be noted that two adjacent spring clip means 23 may be formed of a single integral piece of spring steel, as clearly indicated in FIG. 4.

To use the holding device 11 of the present invention, it is merely attached to the cooking device 19 as shown in FIG. 5 and one or more articles 13 of food are attached thereto so that they will be suspended in the heated oil 17 by slipping the sticks 15 onto which articles 13 of food are impaled between the body means 21 and the spring clip means 23 until each stick 15 is substantially centered in one of the transverse groove means 27 as shown in FIG. 4. When the articles 15 of food have been fully processed, they are simply removed from the holding device 11 using manual force.

Figure 6:
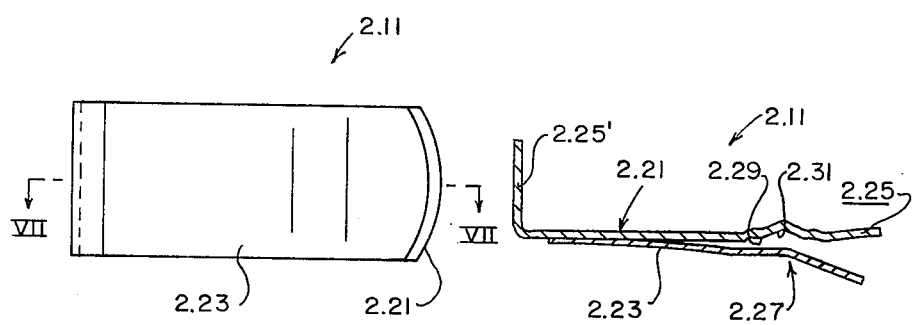
FIG. 6 is a front elevational view of a second embodiment of a holding device of the present invention.
Figure 7:
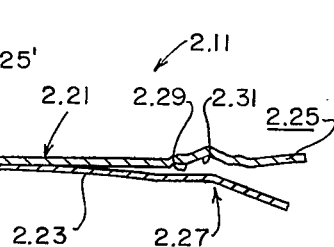
FIG. 7 is a sectional view as taken on line VII—VII of FIG. 6.
Figure 8:
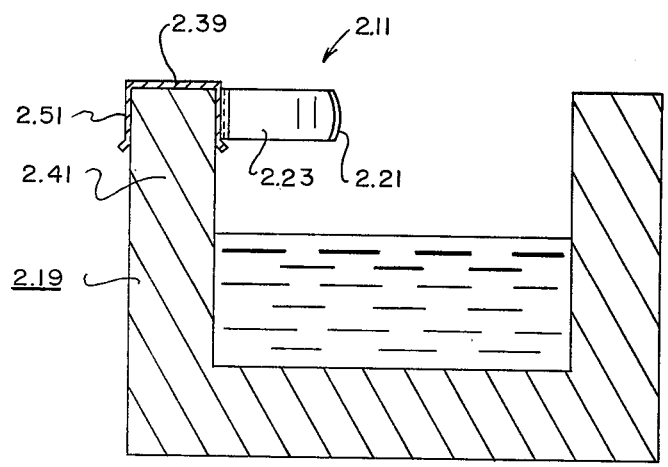
FIG. 8 is a front elevational view thereof showing the holding device attached to a cooking device.

A second embodiment of the holding device of the present invention is shown in FIGS. 6, 7 and 8 and identified by the numeral 2.11. The holding device 2.11 is similar to the holding device 11 and includes a body means 2.21 and one spring clip means 2.23.

The body means 2.21 consist of a rigid, elongated member 2.25 having one transverse groove means 2.27 thereacross (see FIG. 7). The groove means 2.27 includes a first transverse groove 2.29 and a second transverse groove 2.31 positioned within the first transverse groove 2.29 (see FIG. 7). The specific shape and construction of the grooves 2.29, 2.31 are identical to that of the grooves 29, 31 of the holding device 11 and references should be made to the above description thereof for a full and detailed description. The end 2.25' of the member 2.25 opposite the groove means 2.27 is preferably bent at a substantially 90° angle for reasons which will hereinafter become apparent.

The spring clip means 2.23 is substantially identical to one of the spring clip means 23 of the holding device 11 and reference should be made to the above description thereof for a full and detailed description.

The holding device 2.11 may include a bracket means attached to the body means 2.21 for allowing the holding device 2.11 to be attached to a cooking device. The bracket means may consist simply of a channel member 2.51 fixedly attached to the body member 2.21 (see FIG. 8). More specifically, the bent end 2.25' of the member 2.25 is preferably fixedly attached to the channel member 2.51 in any manner apparent to those skilled in the art such as by being spot welded thereto. The channel member 2.51 is adapted to substantially closely fit over the upper edge 2.39 of a wall 2.41 of the cooking device 2.19 as shown in FIG. 8 so as to removably but securely attach the holding devie 2.11 to the cooking device 2.19.

It should be noted that the channel member 2.51 may be elongated and a plurality of body means 2.21 may be attached thereto (not shown).

The specific construction and use of the holding device 2.11 is substantially identical to that of the holding device 11 and reference should be made to the above description thereof for a full and detailed description.

As thus constructed and used, the present invention provides a holding device which will suspend food articles that are impaled on sticks while the food articules are processed regardless whether the sticks have a circular or substantially rectangular cross section, and which will not be damaged (e.g., "sprung") by sticks of various cross sectional shapes.

Although the invention has been described and illustrated with respect to a preferred embodiment thereof, it is not to be so limited, since changes and modifications may be made therein which are within the full intended scope of the invention.

I claim:

1. A holding device for use with an article of food that is impaled on a stick, said holding device comprising:
   (a) body means having a pair of small vee-shaped grooves extending transversely thereacross and a central larger vee-shaped groove extending transversely thereacross; and
   (b) spring clamp means having a first portion attached to said body means and having a second portion extending across said grooves for clamping the stick to said body means to hold the article of food from said body means.

2. The holding device of claim 1 in which said holding device is for use with a cooking device and in which is included bracket means attached to said body means for attaching said body means to said cooking device.

3. The holding device of claim 2 in which said bracket means includes a pair of hook members for placement over the upper edge of a wall of said cooking device.

4. The holding device of claim 2 in which said bracket means includes a channel member for placement over the upper edge of a wall of said cooking device.

5. A holding device for holding food articles that are impaled on sticks having rectangular and/or circular cross sections and for being removably attached to the upper edge of a wall of cooking device to suspend the food articles within the cooking device, said holding device comprising:
   (a) an elongated body means having a plurality of groove means extending transversely thereacross, each of said groove means having a pair of spaced shallow vee-shaped grooves and a larger deep vee-shaped groove positioned between said pair of spaced shallow vee-shaped grooves;
   (b) bracket means attached to said body means for removably attaching said body means to the cooking device, said bracket means including a pair of hook members for placement over the upper edge of a wall of said cooking device; and
   (c) a plurality of spring clip means, each of said spring clip means having a first portion for being attached to said body means and having a second portion for extending across one of said groove means for selectively clamping one of said sticks to said body means with any of said sticks having a rectangular cross section held with the edges thereof positioned within said pair of spaced shallow vee-shaped grooves and with any of said sticks having a circular cross section held in said larger deep vee-shaped groove.

6. The holding device of claim 5 in which said second portion of each of said spring clip means begins to angle outward of said body means substantially at the center of said groove means with which it is associated.

7. The holding device of claim 5 in which said body means, said bracket means, and said spring clip means are constructed of stainless steel.

* * * * *